UNITED STATES PATENT OFFICE.

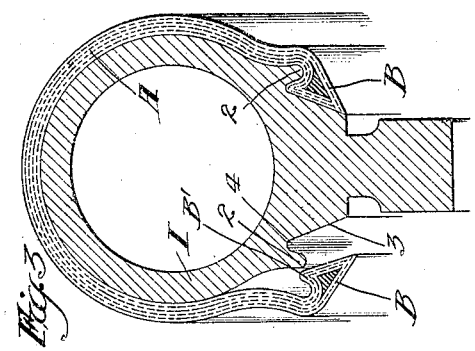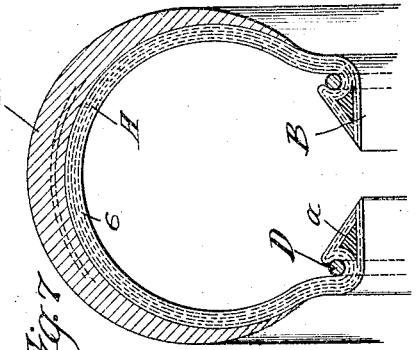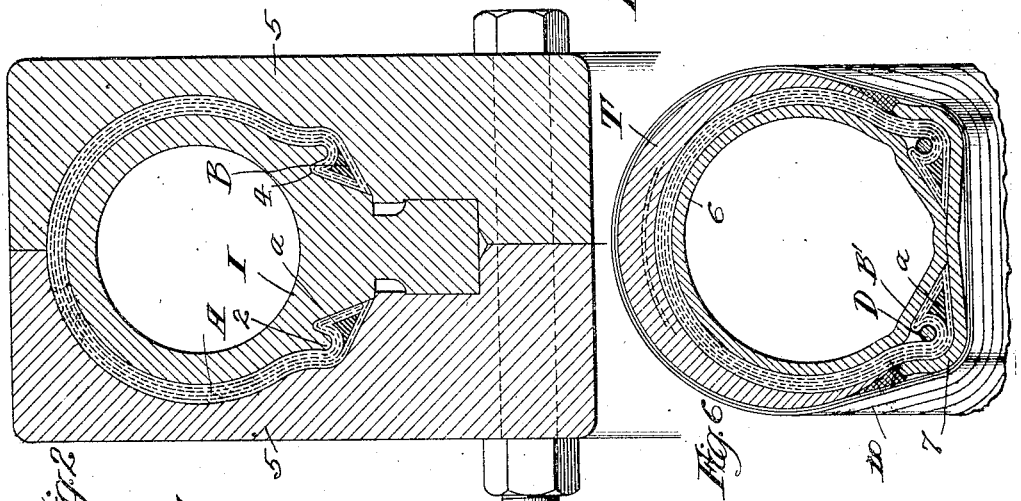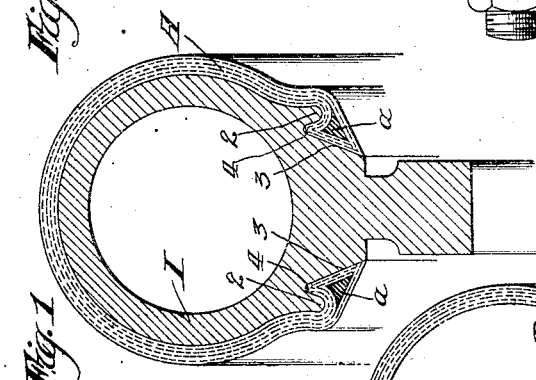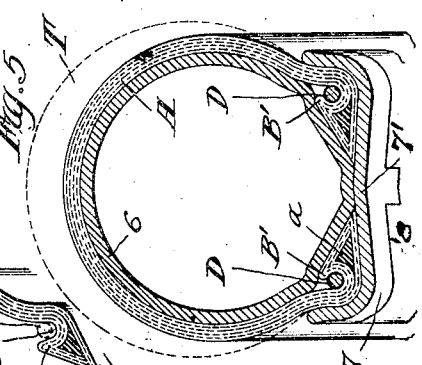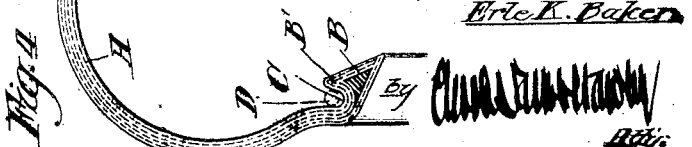

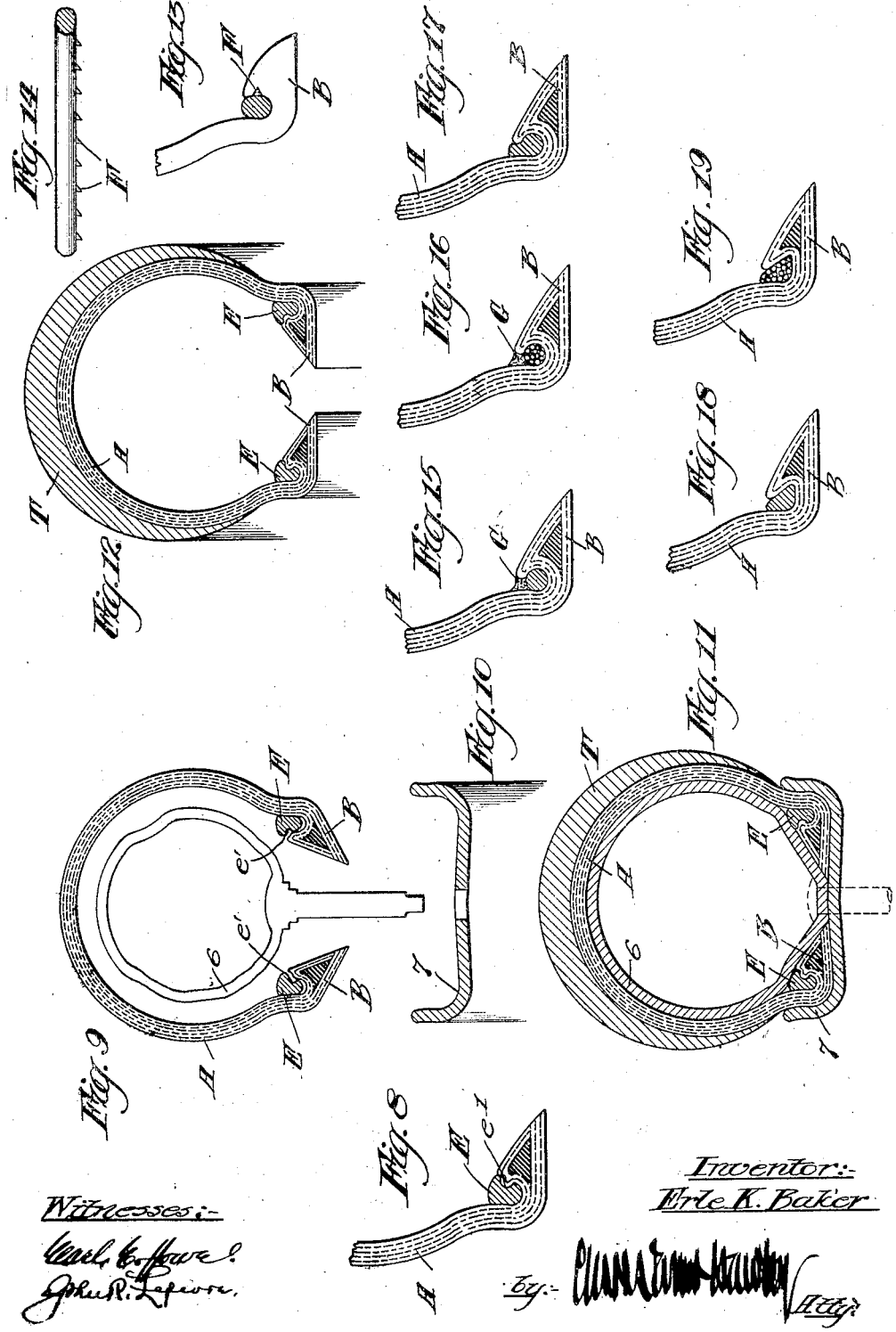

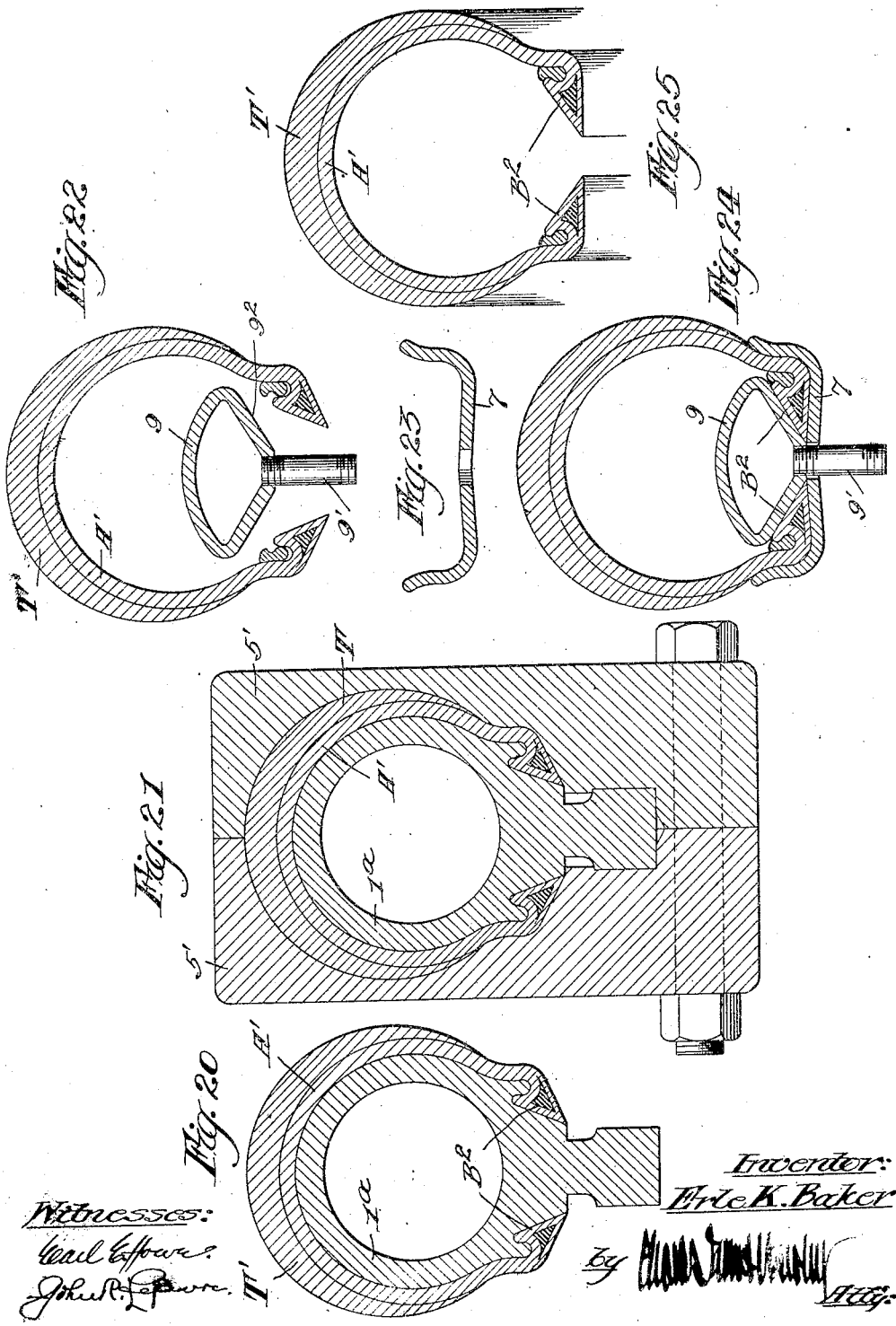

ERLE KING BAKER, OF CHICAGO, ILLINOIS, ASSIGNOR, BY MESNE ASSIGNMENTS, TO HIMSELF AND CHARLES GILBERT HAWLEY, OF CHICAGO, ILLINOIS.

PNEUMATIC-TIRE CASING.

1,314,930.       Specification of Letters Patent.    Patented Sept. 2, 1919.

Application filed October 31, 1914. Serial No. 869,569.

*To all whom it may concern:*

Be it known that I, ERLE KING BAKER, a citizen of the United States, and a resident of Chicago, county of Cook, and State of Illinois, have invented certain new and useful Improvements in Pneumatic-Tire Casings, of which the following is a specification.

My invention relates to improvements in pneumatic tire casings and to improvements in the art of manufacturing the same. The object of my invention is to overcome difficulties in the manufacture of such tire casings as are generally disclosed in Letters Patent Number 780,209, 865,326 and 903,714, and to produce a practical tire casing possessing superior qualities. A special object of my invention is to effectively embed the of my invention is to effectively embed the non-stretchable rings in the base flanges or portions of such casings and make them true integral parts of the unitary structure. Other objects of my invention will appear hereinafter.

My invention consists primarily in forming the carcass of the tire casing with internal open grooves in the base portions or flanges, then inserting the metallic rings and then forcibly closing the grooves by compressing the inner parts of the base portions upon respective rings, and thus securely embedding the rings in, and unifying them with, the base portions. My invention also resides in the products of the process here briefly described.

My invention will be more readily understood by reference to the accompanying drawings forming a part of this specification, and in which I have illustrated the manner in which I prefer to carry out my process; also the means employed, and also my novel products. I have not attempted to show a complete annular tire casing, nor the annularly complete parts used in building the same, for the simple cross sectional views are sufficient to clearly explain the invention to one skilled in the art. In said drawings, Figure 1 is a cross section of the mold core and a tire carcass built thereon; Fig. 2 shows the core and carcass inclosed in the external mold; Fig. 3 shows the manner of stripping the carcass from the core, after removal from the external mold; Fig. 4 shows a cross section of the carcass after it is stripped from the core, in readiness to receive the endless metal rings; Fig. 5 shows the manner in which I prefer to compress or close the base portions upon respective rings, this being accomplished by an outwardly expanded transversely split ring substantially of the form of the wheel rim upon which the tire is intended to be used; Fig. 6 is like unto Fig. 5 and shows the method of applying the tread portion to the carcass; Fig. 7 is a cross section of a completed tire casing; Fig. 8 is a sectional view showing a base portion containing an endless ring of modified cross section; Figs. 9, 10 and 11 represent several stages in the manufacture of a tire casing of the form indicated in Fig. 8; Fig. 12 is a section of that completed casing; Fig. 13 represents a further modified form of the base portion and contained ring; Fig. 14 is a detail of the ring shown in Fig. 13; Figs. 15, 16, 17, 18 and 19 represent still further modifications of the base portions and rings; Fig. 20 shows a core and both a carcass and a tread portion built thereon; Fig. 21 illustrates the manner in which the treaded carcass of Fig. 20 is cured; Figs. 22 and 23 depict base pinching or compressing devices of modfied form; Fig. 24 shows the parts in position for the secondary vulcanization or "setting" of the tire bases upon their embedded rings; and Fig. 25 is a cross section of a completed tire made in the manner shown in Figs. 20 to 24.

As indicated by these drawings and as will be better understood from the following description, the means employed in carrying out the process and also the construction of the tire casing may be variously modified without departing from the spirit of the invention; and the invention is not confined to the specific steps, details or forms herein shown.

Referring to Figs. 1 to 7, it will be seen that in carrying out my process I preferably employ an annular mold core, 1, which is characterized by ribs or beads, 2, 2, and the conical surfaces 3, 3. Upon this core I construct, by hand or by machine, the carcass A, the same preferably comprising several layers of rubberized fabric. The first layers are forced into the grooves, 4, back of the ribs, 2, 2. I then place the relatively imcompressible filler rings, *a*, in the resultant grooves of the fabric. The outer layers of the carcass fabric are then applied and the inner edges of the fabric made to cover or inclose the fillers, a, a. Upon completion of this operation I inclose the mold and carcass in the divided external mold, 5, 5, and therein vulcanize the carcass. I next remove the mold parts, 5, 5; and then, as indicated in Fig. 3, I loosen the base portions, B, from the beads, 2, and strip the carcass from the core, 1. At this stage the carcass has the cross sectional appearance shown in Fig. 4; and it will be noted that the base portions, B, B, contain internal annular grooves, C, C. I then place the endless metal rings, D, D, in the grooves, C, as indicated by the dotted circles in Fig. 4. In preparing the carcass in the manner described, I flare the base portions, B, inwardly toward the axis of the tire casing and preferably make the grooves of such depth that when first placed thereon the rings do not bottom in them. Having thus placed the rings, I insert an air bag, 6, and then place the carcass on the mold ring, 7. this secondary mold is of substantially the same cross section as the wheel rim upon which the completed tire is to be used. Preferably, it is a transversely split and integrally flanged metal ring. The split in the ring is shown by the line, 8, in Fig. 5. This line may be irregular, to furnish interlocking points, that serve to hold the ends in alinement when the ring is expanded within the carcass. I prefer also that the middle portion, 7', of the ring shall be bowed outwardly as shown, to lift the bases and aid in overcoming their tendency to sag even after the secondary vulcanization. The ring is first contracted or collapsed and loosely lodged upon the bases, B. It is then expanded until the ends of the ring snap together, which expanding action extends the bases, B, by forcing them outwardly This action rolls the base portions outwardly with respect to the center axis of the tire and puts the parts which contain the fillers, a, a, under compression and thus effectively closes the grooves, C, C, compressing the base portions firmly upon the respective rings. As well depicted in Fig. 5, this pinching or compression causes the upstanding portions, B', of the bases to lap over the rings, which are thus firmly embedded or fastened in the bases. I prefer this method of closing the grooves and compressing the upstanding portions, B', to be functionally equivalent but more difficult operation of forcing the upstanding portions outwardly from points within the core, 1. As the next step I proceed to apply the tread portion, T; as indicated by the dotted line in Fig. 5. Before doing so I inflate the air bag 6, which gives the carcass sufficient rigidity to withstand the forces used in applying the tread. It also provides sufficient force to hold the ring containing base portions under compression while they are being "set". After putting on the tread wrappings 10, the parts are secondarily and finally vulcanized. Thus while the thread is being vulcanized, the vulcanization of the carcass and its base portions is completed and it is obvious that this action unifies the base portions and containing rings and gives the base portions the permanent "set" required to prevent their return to the condition of Fig. 4, when the wrappings 10 and the mold ring 7 are removed. The resultant form of the completed tire casing and the fixed positions and conditions of the base portions are clearly shown in Fig. 7. The internal grooves may take various forms, but it is preferable that the simple structure shown be adhered to. On the other hand rings of many different cross sections may be embedded in the grooves and the base portions will always conform thereto as required to secure the rings in place, because of the described forcible closing of the grooves. Thus in Figs. 8 to 12 I have illustrated a tire casing of modified form, the same being characterized by endless rings, E, which are provided with grooves, e', in their inner sides. In assembling the parts in the described manner the base material is forced into these grooves, as clearly shown in Figs. 8, 11 and 12. In this way the grooves in the bases are obliterated and the rings are firmly embedded in and unified with the other portions of the bases. Figs. 17 to 19, illustrate other practical forms of the metal rings and the manner of embedding same. The ring shown in Figs. 13 and 14 is formed with a sharp rib or number of sharp points, F, which aid in securing the ring in place. In Figs. 15 and 16 I have shown the manner in which I complete the closure of the grooves by means of a filling, G, of soft rubber. In practice the filling material is preferably inserted in the grooves with the rings and is squeezed out, as shown in Figs. 15 and 16, when the bases are compressed. To overcome objections urged to the use of an air bag, 6, and to otherwise somewhat simplify the manufacture of my novel casing, I sometimes employ the modified apparatus shown in Figs. 20 to 24. In this modification of my process I build both the raw carcass, A', and tread, T', on the inner core, $1^a$, before I inclose the same in the external mold, 5'. Thus it comes from the mold in the form shown in Fig. 22. At such time I place the endless rings in the base grooves and also put the hollow steam-ring, 9, into the carcass. The steam ring is preferably endless, and, 9', represents its steam feed nipple or stem. The inner-side surface, $9^2$, of the steam ring is of the form which is to be given to the outer surfaces of the base portions, $B^2$, of the finished tire. Obviously the diameter of the ring is the same as the corresponding diameter of the finished tire. Having thus assembled the parts, I apply the secondary split mold ring, 7, as before. This having been put in place, I furnish steam to the hollow ring, 9; at a temperature and long enough to complete the vulcanization and "setting" of the bases, $B^2$. When the parts, 9, and, 7, are removed the finished tire is found in the appearance of Fig. 25.

My process possesses advantages which at once will be apparent to one skilled in the art; and the described product is superior to all kindred products; chiefly by reason of the freedom imparted to the sides of the casing, the great strength and solidity of the base portions, the complete unification of the metallic and rubberized portions of the base, the closing of the ring-containing grooves and the flexibility of the inner edges of the bases, which causes them to tightly grip the wheel rim to which they are applied.

I do not herein claim the apparatus disclosed, but reserve the same for a companion application.

Having thus described my invention I claim as new and desire to secure by Letters Patent:—

1. The herein described improvement, comprising a tire casing provided with internally grooved base portions, filler cores of relatively incompressible material enveloped by said base portions, and rings of incompressible material embedded in the grooves of said base portions, said rings being provided with sharpened spurs adapted to penetrate the base portions and retain said rings in the said grooves, substantially as described.

2. The herein described improvement comprising a tire casing provided with internally grooved base portions, filler cores of relatively incompressible material enveloped by said base portions, inextensible rings of incompressible material and irregular contour embedded in respective grooves of said base portions, and said base portions being compressibly embedded in the irregularities of said rings and being thereby firmly anchored.

3. The herein described improvement comprising a tire casing provided with internally grooved base portions, filler cores of relatively incompressible material enveloped by said base portions, inextensible rings of incompressible material and irregular contour positioned in respective grooves of said base portions, and the walls of each groove being intimately conformed to the irregular contour of the inextensible rings, whereby the rings and base portions are firmly united.

In testimony whereof, I have hereunto set my hand, this 28th day of October, 1914, in the presence of two subscribing witnesses.

ERLE KING BAKER.

Witnesses:
JAMES S. DODGE, Jr.,
L. A. PLAGGE.